(12) United States Patent
Suzuki (10) Patent No.: US 10,135,787 B2
(45) Date of Patent: Nov. 20, 2018

(54) FILTERING SYSTEM, MANAGEMENT DEVICE, FILTERING METHOD AND MANAGEMENT PROGRAM

(71) Applicant: NEC Platforms, Ltd., Kawasaki-shi, Kanagawa (JP)

(72) Inventor: Yoshiaki Suzuki, Kanagawa (JP)

(73) Assignee: NEC PLATFORMS, LTD., Kanagawa (JP)

( * ) Notice: Subject to any disclaimer, the term of this patent is extended or adjusted under 35 U.S.C. 154(b) by 60 days.

(21) Appl. No.: 15/307,194

(22) PCT Filed: Mar. 8, 2016

(86) PCT No.: PCT/JP2016/057175
§ 371 (c)(1),
(2) Date: Oct. 27, 2016

(87) PCT Pub. No.: WO2017/013894
PCT Pub. Date: Jan. 26, 2017

(65) Prior Publication Data
US 2017/0171155 A1    Jun. 15, 2017

(30) Foreign Application Priority Data
Jul. 23, 2015    (JP) ................. 2015-145636

(51) Int. Cl.
*H04L 29/06*    (2006.01)
*H04L 12/26*    (2006.01)

(52) U.S. Cl.
CPC .......... *H04L 63/0263* (2013.01); *H04L 43/12* (2013.01); *H04L 63/1425* (2013.01)

(58) Field of Classification Search
CPC ......... G06F 11/1446–11/1469; G06F 21/6218; H04L 9/085; H04L 9/0861; H04L 9/0894;
(Continued)

(56) References Cited

U.S. PATENT DOCUMENTS

| 2006/0026669 | A1  | 2/2006 | Zakas |
| 2006/0195896 | A1* | 8/2006 | Fulp .................... H04L 63/0218 726/11 |
| 2007/0050496 | A1* | 3/2007 | Fontijn ................. H04W 24/00 709/224 |
| 2007/0160197 | A1* | 7/2007 | Kagaya ................ G06Q 20/382 380/28 |

(Continued)

FOREIGN PATENT DOCUMENTS

| CN | 1781282 A | 5/2006 |
| CN | 1947372 A | 4/2007 |

(Continued)

OTHER PUBLICATIONS

"Secret Sharing Schemes", Iwamoto, URL: http://ohta-lab.jp/users/mitsugu/research/SSS/main.html, searched Jun. 30, 2016.
(Continued)

*Primary Examiner* — Kevin Bechtel (57) ABSTRACT

The present invention prevents all of the filter rules from leaking and the filter functions of an entire network from stopping, even if problems arise in a filter device, etc. performing filtering. A management device of a filtering system, which includes a plurality of devices which perform filtering of communication data based on filter rules, and a management device which manages the filter rules, in a case of a first of the devices that is connected to an external network not through another of the devices having entered a predetermined state, reconstructs decentralized filter rules set in the first of the devices based on a plurality of decentralized filter rules received from a plurality of second of the devices connected to an external network via the first of the devices, and sets the decentralized filter rules thus reconstructed in the plurality of second devices, in which the decentralized filter rules are decentralized to be able to reconstruct the filter rules without using all of the decentralized filter rules.

9 Claims, 8 Drawing Sheets

(58) Field of Classification Search
CPC .... H04L 41/084–41/0863; H04L 43/12; H04L 63/0263; H04L 63/0428; H04L 63/1425; H04L 63/20; H04L 67/1097; H04L 2209/60
See application file for complete search history.

(56) References Cited

U.S. PATENT DOCUMENTS

| | | | |
|---|---|---|---|
| 2007/0239615 | A1 | 10/2007 | Matsuzaki et al. |
| 2008/0232580 | A1 | 9/2008 | Hosaka et al. |
| 2009/0222812 | A1* | 9/2009 | Nissen ............... G06F 11/2002 717/173 |
| 2011/0119730 | A1 | 5/2011 | Eldar et al. |
| 2014/0245423 | A1 | 8/2014 | Lee |

FOREIGN PATENT DOCUMENTS

| | | |
|---|---|---|
| CN | 101276524 A | 10/2008 |
| JP | 2001-249866 A | 9/2001 |
| JP | 2003-244247 A | 8/2003 |
| JP | 2011-172126 A | 9/2011 |
| JP | 5967739 B1 | 8/2016 |

OTHER PUBLICATIONS

"Secret Sharing Scheme and Its Applications", Hiroshi Doi, Professor of information security research course, Information Security Science vol. 4, Nov. 2012.

Written Opinion for PCT Application No. PCT/JP2016/057175 dated May 24, 2016.

Amos Beimel et al., "Secret Sharing and Non-Shannon Information Inequalities", IEEE Transactions on Information Theory, Sep. 1, 2011, pp. 5634-5649, vol. 57, No. 9, IEEE Press, USA.

Extended European Search Report for EP Application No. 16781040.7 dated Oct. 6, 2017.

Chinese Office Action for CN Application No. 201680001156.9 dated Aug. 22, 2017 with English Translation.

* cited by examiner

FILTERING SYSTEM, MANAGEMENT DEVICE, FILTERING METHOD AND MANAGEMENT PROGRAM

This application is a National Stage Entry of PCT/JP2016/057175 filed on Mar. 8, 2016, which claims priority from Japanese Patent Application 2015-145636 filed on Jul. 23, 2015, the contents of all of which are incorporated herein by reference, in their entirety.

TECHNICAL FIELD

The present invention relates to a filtering system, management device, filtering method and management program, for managing the filter rules used during communication.

BACKGROUND ART

In communication fields such as packet communication, the filtering of inappropriate data is generally performed based on predetermined filter rules.

More specifically, it observes communicated data in packet units. Then, the contents in predetermined items such as the address, port number and class of protocol, which are included in header information of a packet that is an observation target, and the pattern of predetermined items such as the address of the packet, port number and class of protocol, which are converted to database as filter rules, are compared. Then, based on whether the compared contents of both agree, it is determined whether to allow the packet that is the observation target to pass.

In the case of performing such filtering, in order to accurately and quickly judge all packets, sufficient processing ability is required in the device performing the filtering based on the set filter rules (hereinafter referred to as "filter device"). In other words, the performance of the filter device and the ability for filtering are in a trade-off relationship. Then, it is not necessarily possible to provide a filter device of sufficient processing ability such that problems do not arise under any conditions.

For example, a function of filtering packets is included in the majority of existing routers and firewalls. In other words, routers and firewalls act as filter devices. However, there is a limit to the processing ability of these routers, etc. For this reason, even if no problems arise during normal usage, if receiving an abundance of packets from an illegal attack such as a Dos attack (Denial of Service attack), the load on the CPU (Central Processing Unit) performing the processing will increase, a result of which the filtering function itself may stop.

In order to prevent the occurrence of a situation like the interruption of this filtering function, upon suppressing as much as possible the load acting on the filter device such as a router, it is necessary to perform examination of communication packets.

In addition, as a special challenge, unauthorized access problems from not only external networks such as the Internet, but also internal networks such as LAN (Local Area Network) have also increased, and the necessity for strengthening internal security has also arisen.

Herein, as one method for reducing the load acting on filter devices, along with resolving the unauthorized access problem by internal networks, there is a technique of installing a plurality of filter devices in external and internal networks, and distributing the processing of filtering among this plurality of devices.

By distributing the filtering processing to a plurality of filter devices in this way, it becomes possible to reduce the load acting on each filter device, as well as revolve the unauthorized access problem by internal networks.

One example of technology for distribution of such load is described in Patent Document 1. The technology described in Patent Document 1 sets filter rules to distribute in the plurality of filter devices. In addition, the technology described in Patent Document 1 sets filter rules of respectively different contents in devices installed in the external network, and devices installed in the internal network.

More specifically, filter rules of light load are set in filter devices of the external network which have a large number of packets defined as observation targets due to the large traffic volume passing through. For example, filter rules are set having a comparatively small number of rules as well as low update frequency.

On the other hand, in a device in the internal network for which the number of packets defined as the observation target is small due to the traffic volume passing through being small, filter rules of heavy load are set. For example, filter rules for every subnet for which the rule number is liable to increase, and filter rules having a high update frequency have heavy load; therefore, these filter rules are set in the filter devices of the internal network. It should be noted that the management of information related to the setting of such filter rules and setting of filter rules are managed by a dedicated filter management server.

The technology described in Patent Document 1 distributes the load acting on each filter device by the filter management server decentralizing the filter rules upon considering the number of packets that are the observation target by each filter device, a result of which the scalability related to an increase in load is ensured.

Patent Document 1: Japanese Unexamined Patent Application, Publication No. 2003-244247

Non-Patent Document 1: DOI, Hiroshi; "Regarding Secret Sharing Schemes and Application Thereof" (online), November 2012, Institute of Information Security, Vol. 4 (Searched Jun. 30, 2016), Internet <URL: www.iise-c.ac.jp/proc/vol0004/doi.pdf>

Non-Patent Document 2: IWAMOTO, Mitsugi; "Secret Sharing Schemes," (online), (Searched Jun. 30, 2016), Internet <URL: http://ohta-lab.jp/users/mitsugu/research/SSS/main.html>

DISCLOSURE OF THE INVENTION

Problems to be Solved by the Invention

By using the aforementioned such technology described in Patent Document 1, etc., it is possible to distribute the load acting on each filter device.

However, even if the load acting on each filter device can be reduced by performing load distribution, the fact that there is an upper limit in the ability for each filter device to able to process will not change. For this reason, even if performing load distribution, the problem arises in that, if supposing there is a Dos attack or the like such that a load greater than tolerable acts on each filter device, the function of each filter device will stop, each filter device will deny service thereafter, and become unable to communicate.

In addition, with the technology described in Patent Document 1, etc., a mechanism such that sets the filter rules, which had been set in a filter device that became unable to communicate, in another substitute filter device is not being prepared. For this reason, a problem also arises in that it subsequently enters a state allowing attack packets that should have been filtered according to these filter rules to pass into the network.

On the other hand, a problem also arises in connection with the filter management server. In maintenance, there may be a case such that filter rules are frequently changed even after setting the filter rules once. On the other hand, there are also cases where the filters are not changed as frequently.

In this way, although there are various management methods for filter rules, even in the case of using any of the management methods, it has been necessary to install a dedicated filter management server, and manage the filter rules all together with the filter management server.

However, when unauthorized access is conducted by a direct connection with the filter management server itself in this case, the entirety of the filter rules will be stolen from the filter management server, and the filter management server will be damaged. Then, the problem arises in that the filtering function of the network as a whole thereby becomes a denial of service.

Therefore, the present invention has an object of providing a filtering system, management device, filtering method and management program capable of preventing all of the filter rules from leaking out and the filter function of the entire network from stopping, even if a problem arises in a filter device, etc. performing the filtering.

Means for Solving the Problems

According to a first aspect of the present invention, a filtering system is provided that includes: a plurality of devices which perform filtering of communication data based on filter rules, and a management device which manages the filter rules, in which the management device, in a case of a first of the devices that is connected to an external network not through another of the devices having entered a predetermined state, reconstructs decentralized filter rules set in the first of the devices based on a plurality of decentralized filter rules received from a plurality of second of the devices connected to an external network via the first of the devices, and sets the decentralized filter rules thus reconstructed in the plurality of second devices, and the decentralized filter rules are decentralized to be able to reconstruct the filter rules without using all of the decentralized filter rules.

According to a second aspect of the present invention, a management device is provided that is communicably connected with a plurality of devices performing filtering of communication data based on filter rules, and that manages the filter rules, in which, in a case of a first of the devices connecting to an external network not through another of the devices having entered a predetermined state, the management device reconstructs decentralized filter rules set in the first of the devices, based on a plurality of decentralized filter rules received from a plurality of second of the devices connecting to the external network via the first of the devices, and sets the decentralized filter rules thus reconstructed in the plurality of the second of the devices, and the decentralized filter rules are distributed to be able to reconstruct the filter rules without using all of the decentralized filter rules.

According to a third aspect of the present invention, a filtering method is provided that is performed by a system which includes a plurality of devices performing filtering of communication data based on filter rules, and a management device that manages the filter rules, the filtering method including: the management device, in a case of a first of the devices that is connected to an external network not through another of the devices having entered a predetermined state, reconstructing decentralized filter rules set in the first of the devices based on a plurality of decentralized filter rules received from a plurality of second of the devices connected to an external network via the first of the devices, and sets the decentralized filter rules thus reconstructed in the plurality of second devices, in which the decentralized filter rules are decentralized to be able to reconstruct the filter rules without using all of the decentralized filter rules.

According to a fourth aspect of the present invention, a management program is provided for enabling a computer that is communicably connected with a plurality of devices performing filtering of communication data based on filter rules to function as a management device for managing the filter rules, in which the computer, in a case of a first of the devices connected with the external network by not going through another of the devices, entering a predetermined state, reconstructs decentralized filter rules set in the first of the devices based on a plurality of decentralized filter rules received from a plurality of second of the devices connected to the external network via the first of the devices, and sets the decentralized filter rules thus reconstructed in the plurality of the second of the devices, in which the decentralized filter rules are decentralized to enable reconstructing the filter rules without using all of the decentralized filter rules.

Effects of the Invention

According to the present invention, it is possible to prevent all of the filter rules from leaking out and the filter function of the entire network from stopping, even if a problem arises in a filter device, etc. performing the filtering.

BRIEF DESCRIPTION OF THE DRAWINGS

FIG. 4-1 is an image (1/2) representing a state change of each device upon an embodiment of the present invention receiving an external attack;

FIG. 4-2 is an image (2/2) representing a state change of each device upon an embodiment of the present invention receiving an external attack;

PREFERRED MODE FOR CARRYING OUT
THE INVENTION

First, an outline of an embodiment of the present invention will be explained. The present invention achieves an improvement in security by decentralizing and managing filter rules.

For this reason, with the present embodiment, in the case of a certain filter device within a network receiving an attack, before the filter device that is the attack target comes to deny service, and a state breaking communication occurs, a part or the entirety of the filter rules of this filter device are transferred to another filter device.

More specifically, the filter management server decentralizes the filter rules that should be applied to the entire system, using a "secret sharing scheme". Then, it is configured to distribute and store the decentralized filter rules in each of the plurality of filter devices, so that no filter rules remain in the filter management server.

Subsequently, in the case of any filter device receiving an attack, and there is a risk of the filtering function of such filter device going down, the filter rules being stored in other filter devices are collected in the filter management server. Then, the filter management server follows the "secret sharing scheme" to reconstruct the original filter rules prior to decentralization from the collected filter rules. It should be noted that secret sharing scheme is a method for reconstructing all information prior to decentralization based on part of the information in the decentralized information. The specific contents of the secret sharing scheme will be described later.

Then, the filter management server extracts lost filter rules (filter rules taken charge of by filter device receiving attack), as the difference from the filter rules which were stored in other filter devices.

In addition, the filter management server sets the lost filter rules thus extracted in another filter device, located at an inner side of the filter device for which the filtering function went down. The filtering function is thereby automatically made to restore in the entire system.

By configuring in the above way, even in a case in which part of the filter devices receive an attack, and the filtering function goes down, an organization of the other filter devices alternately executing the lost filter rules is automatically constructed. For this reason, it is possible to realize a more secure filtering system.

In addition, it is possible to distribute the load of attack focused enough for one filter device becomes denial of service to a plurality of filter devices, to prevent unauthorized packets from being allowed to reach deep in the network.

As a result, the present embodiment makes it possible to improve network security by decentralizing and managing the information of filter rules of the filter management server.

The above is an outline of the embodiment of the present invention.

Next, an embodiment of the present invention will be explained in detail by referencing the drawings.

Figure 1:
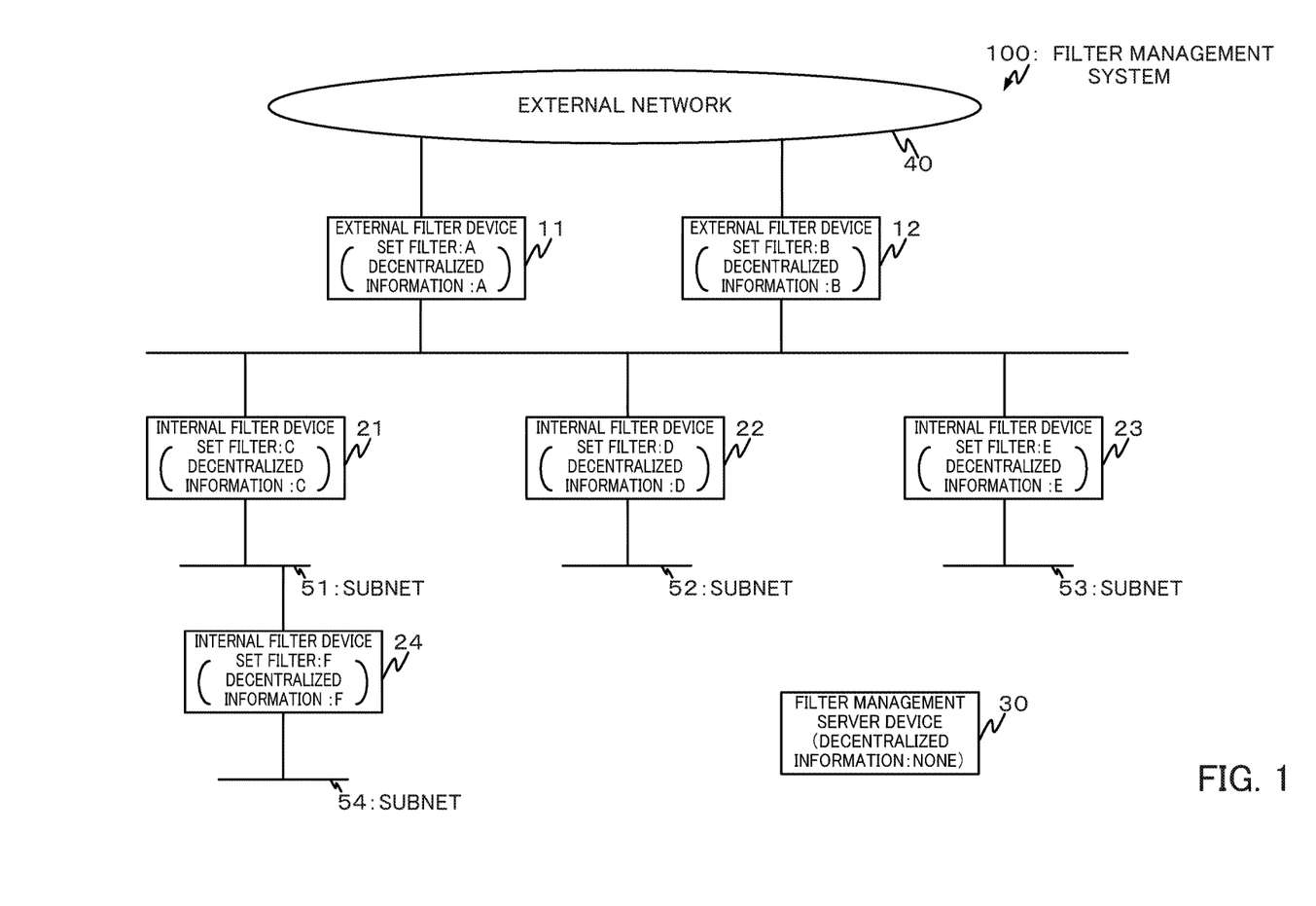
FIG. 1 is a block diagram representing a basic configuration of an overall embodiment of the present invention.

When referencing FIG. 1, the filter management system 100 that is the present embodiment includes: an external filter device 11, external filter device 12, internal filter device 21, internal filter device 22, internal filter device 23, internal filter device 24, filter management server 30, external network 40, subnet 51, subnet 52, subnet 53 and subnet 54.

The filter management server 30 is a server device that decentralizes filter rules to be applied to the overall system, and stores the decentralized filter rules in each of the filter devices.

Each filter device (external filter device 11, external filter device 12, internal filter device 21, internal filter device 22, internal filter device 23 and internal filter device 24) is a device performing filtering based on the filter rules stored in its own filter device. Each of these filter devices is installed in a LAN provided in a company or the like, for example.

In addition, among the respective filter devices, the external filter device 11 and external filter device 12 are located at the connection point with the external network 40. Herein, the external network 40 shall be a network such as the Internet, for example.

On the other hand, the internal filter devices 21 to 24 are filter devices located at connection points with the respective subnets (subnets 51 to 54), which are internal networks. Herein, the respective subnets shall be networks provided for every department, for example.

A communication terminal (omitted from illustration) such as a personal computer or server device is connected to each subnet. Then, these communication terminals perform packet communication mutually with other communication terminals connected to a subnet to which its own communication terminal is connected, with a communication terminal connected to another subnet, and with a communication terminal connected to the external network 40.

The filter management server 30 is connected with each filter device via any subnet or the external network 40, or another network omitted from illustration. Then, the filter management server 30 enters a state capable of communication with each filter device via these networks. Connections between the filter management server 30 and each filter device are omitted from the illustrations.

Next, the functional blocks included in the filter management server 30 will be explained by referencing FIG. 2.

Figure 2:
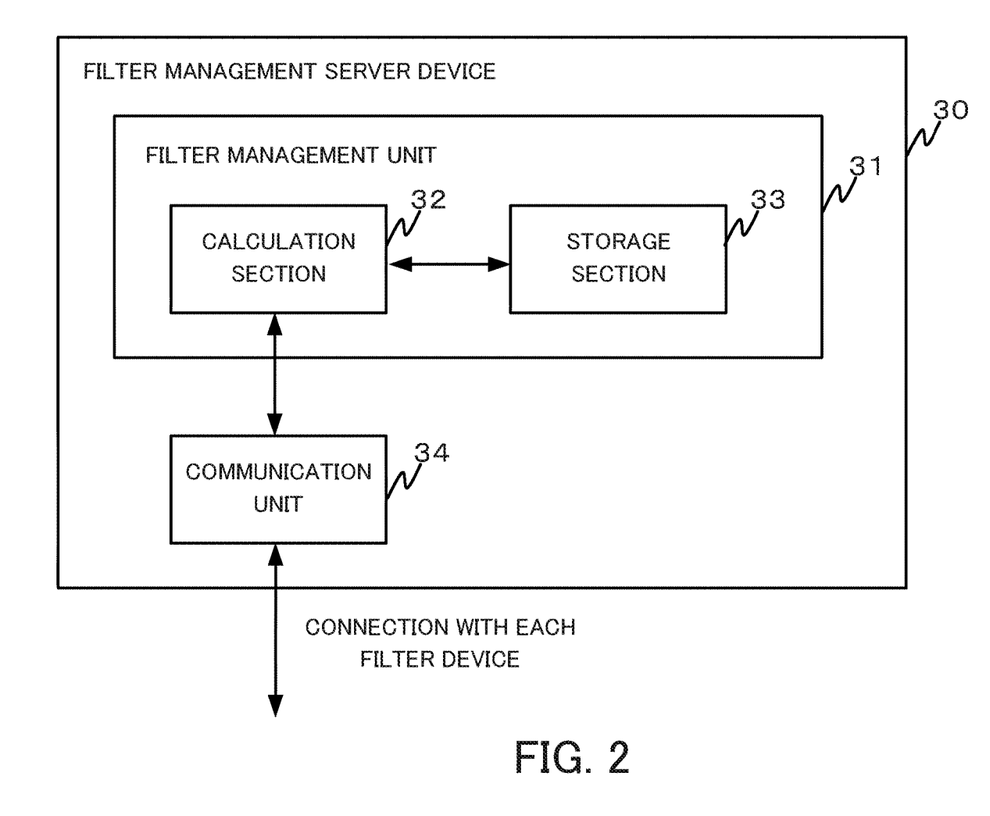
FIG. 2 is a block diagram representing a basic configuration of a filter management server according to an embodiment of the present invention.

When referencing FIG. 2, the filter management server 30 includes a filter management unit 31 and communication unit 34. In addition, the filter management unit 31 includes a calculation section 32 and storage section 33.

The filter management unit 31 is a portion that controls the filter management server 30 overall, as well as managing the filter rules set in each filter device within the filter management system 100. Herein, the filter management unit 31 is realized by the calculation section 32 and storage section 33.

The calculation section 32 is an arithmetic processing unit such as a CPU (Central Processing Unit). In addition, the storage section 33 is a main storage device such as RAM (Random Access Memory) used by the calculation section 32, and is an auxiliary storage device such as a HDD (Hard Disk Drive). The characteristic software of the present embodiment is stored in the storage section 33.

Then, the calculation section 32 reads such software stored in the storage section 33, and performs arithmetic processing based on this software. Then, the filter management unit 31 controls the hardware included in the filter management server 30 based on the results of such arithmetic processing. In other words, the filter management server 30 can be realized by hardware and software cooperating.

The communication unit 34 is a portion for the filter management unit 31 to perform communication with each filter device. The communication unit 34 performs communication with each filter device via any subnet, the external network 40, etc.

Next, the management method of filter rules used in the secret sharing scheme, which is performed by the filter management unit 31 in the filter management server 30, will be explained.

In the present embodiment, the filter management unit 31 generates a plurality of decentralized filter rules by decentralizing the filter rules to be applied to the filter management system 100 using the "secret sharing scheme" as confidential information. It should be noted that such decentralized filter rules are information obtained by decentralizing the pre-decentralization filter rules, which is confidential information. Therefore, such decentralized filter rules are called "decentralized information" as appropriate in the following explanation.

In addition, the filter management server 30 is configured so as to send the respective generated decentralized information to each filter device, and not leave decentralized information in the filter management server 30 after sending. It should be noted that the filter management server 30 stores which decentralized information is sent to which filter device. The filter management server 30 shall thereby grasp which filter device is storing which decentralized information.

Then, each filter device sets the filter rules in its own filter device based on the decentralized information stored by its own filter device, and performs filtering based on the set filter rules.

Herein, in the present embodiment, the filter rules set in each filter device are filter rules that are respectively unique. For example, filter rules A are set in the external filter device 11, as expressed in FIG. 1. In addition, the external filter device 11 stores the filter rules A as decentralized information A.

On the other hand, filter rules B are set in the external filter device 12. In addition, the filter rules B are stored as decentralized information B.

Next, the "secret sharing scheme" will be explained. As mentioned above, the present embodiment achieves an improvement in efficient load distribution of filters and security, by managing filter rules with the secret sharing scheme.

The secret sharing scheme manages data information sought to be made confidential by separating into several (defined as N) decentralized information. Then, the original confidential data can be reconstructed when collecting the decentralized information of some minimum required number thereamong (defined as K; herein, it shall satisfy the relationship of K<N in the present embodiment), and even if the number of decentralized information less than K is collected, the original confidential data cannot be reconstructed. Such a secret sharing scheme is a method known as Shamir's (K,N) threshold scheme. The details of Shamir's (K,N) threshold scheme are described in Non-Patent Document 1 and Non-Patent Document 2, for example.

Then, in the present embodiment, using Shamir's (K,N) threshold scheme, the filter rules are treated as confidential data, and each of the plurality of decentralized filter rules obtained by decentralizing these filter rules are distributed and managed as decentralized information. In addition, the filter rules applied to a filter device for which the load is increasing are reconstructed by decentralized information stored by the remaining devices. Then, using the reconstructed decentralized information, the remaining devices undertake substitution of the filter device for which load is increasing, whereby a considerable decline in the security within the network is prevented.

In addition, when configuring in this way, even if the filter device transferring the filter rules and having stopped the filter function is captured by unauthorized access, what is obtained from this device is only one piece of decentralized information stored by this filter device. Consequently, it is possible to prevent the filter rules held by another device from leaking. For the same reason, the filter rules are not stored all together by the filter management server 30, and are stored by decentralizing to the respective filter devices; therefore, even if assuming to directly access the filter management server 30, it is possible to prevent all of the information of the filter rules from leaking.

Figure 41:
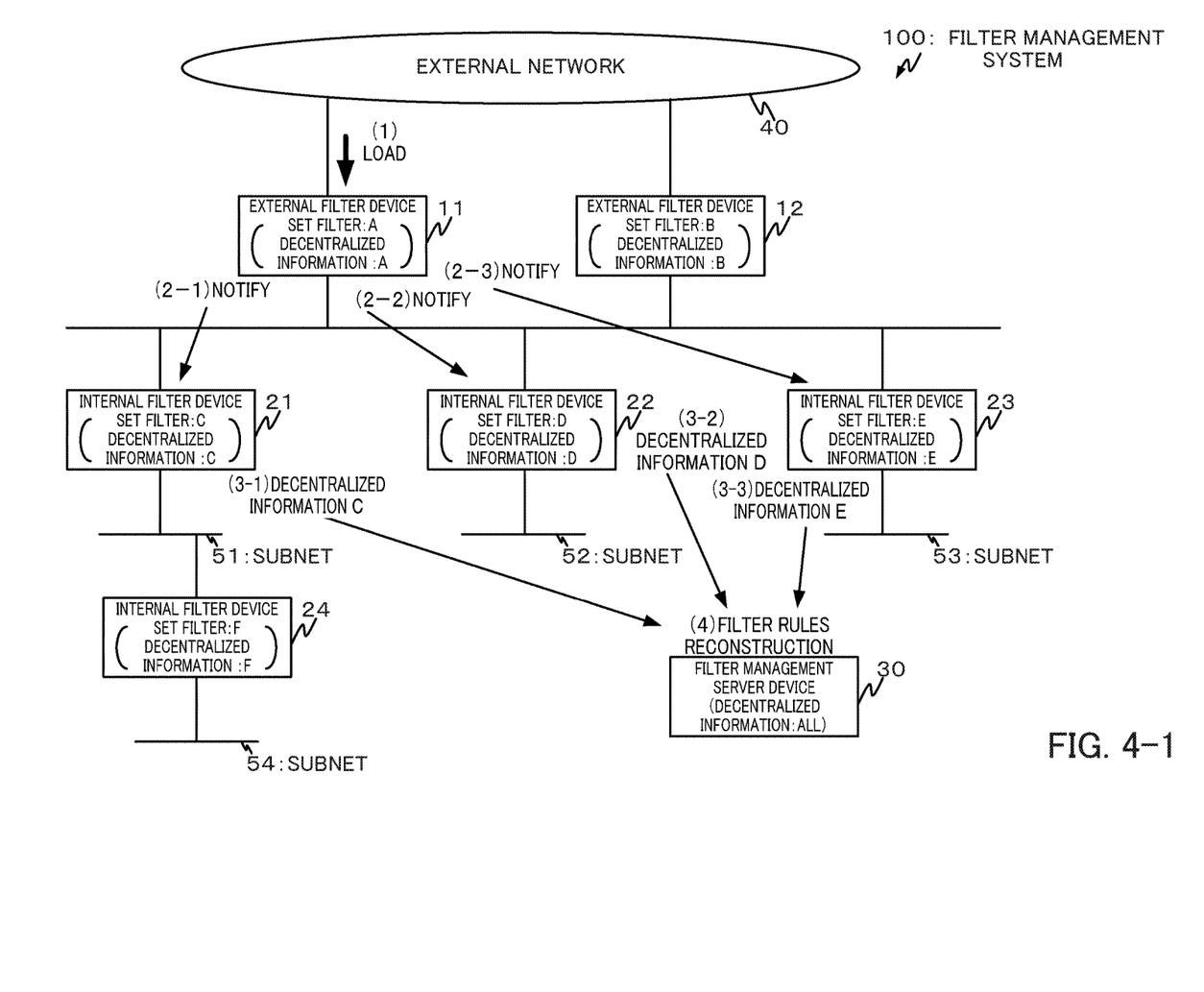
Figure 42:
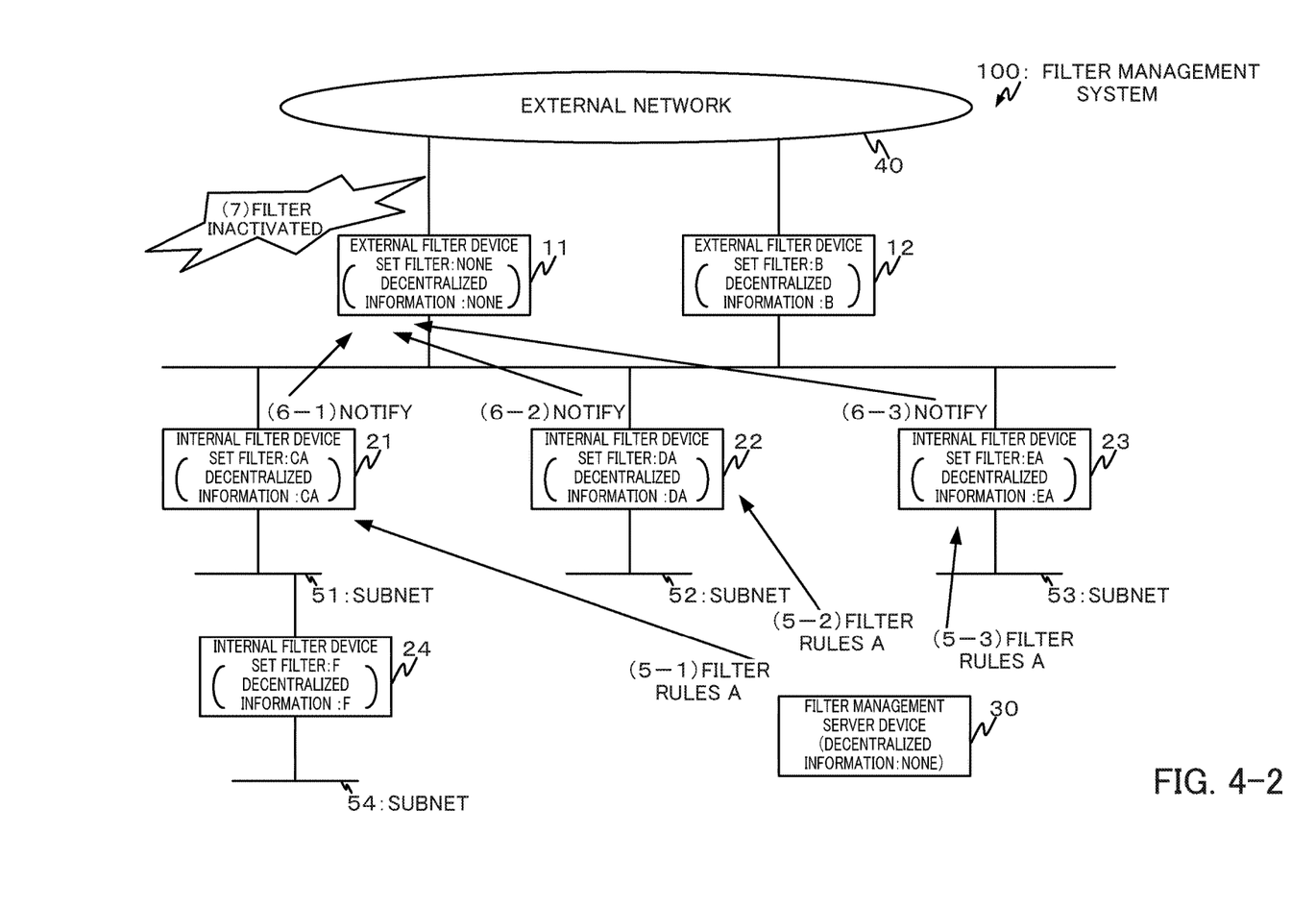

Next, operations of the present embodiment will be explained by referencing the sequence diagram of FIG. 3, and views representing the transmission of information of FIGS. 4-1 and 4-2. It should be noted that a case is assumed of the external filter device 11 being the attack target of a Dos attack or the like as an example in the following explanation.

First, an abundance of packets are sent to the external filter device 11 via the external network 40 caused by a Dos attack or the like. The load on the external filter device 11 thereby increases ("(1) load" in FIG. 4-1).

Herein, each filter device of the present embodiment is always monitoring the load on itself. Then, the external filter device 11, if detecting that the load on the external filter device 11 itself has become at least a certain load accompanying an attack on the external filter device 11 (Step S101 in FIG. 3), notifies this fact to all or a part of the other filter devices (Step S103 in FIG. 3; (2-1) notification, (2-2) notification and (2-3) notification in FIG. 4-1).

It should be noted that, although notification may be done to a part of the filter devices, it is necessary to notify at least K-number of filter devices in the (K,N) threshold scheme as the secret sharing scheme. In the present explanation, a (3,6) threshold scheme shall be used as the secret sharing scheme. This means that the original information can be reconstructed if there are at least 3 (K-number) among the 6 (N-number) of decentralized information pieces. In other words, since K=3 in the present explanation, it is necessary for the external filter device 11 to perform notification to at least three filter devices. In the present example, notification is performed to the three filter devices of the internal filter device 21, the internal filter device 22 and the internal filter device 23, which are located at positions closer to the subnet side than the external filter device 11.

Figure 3:
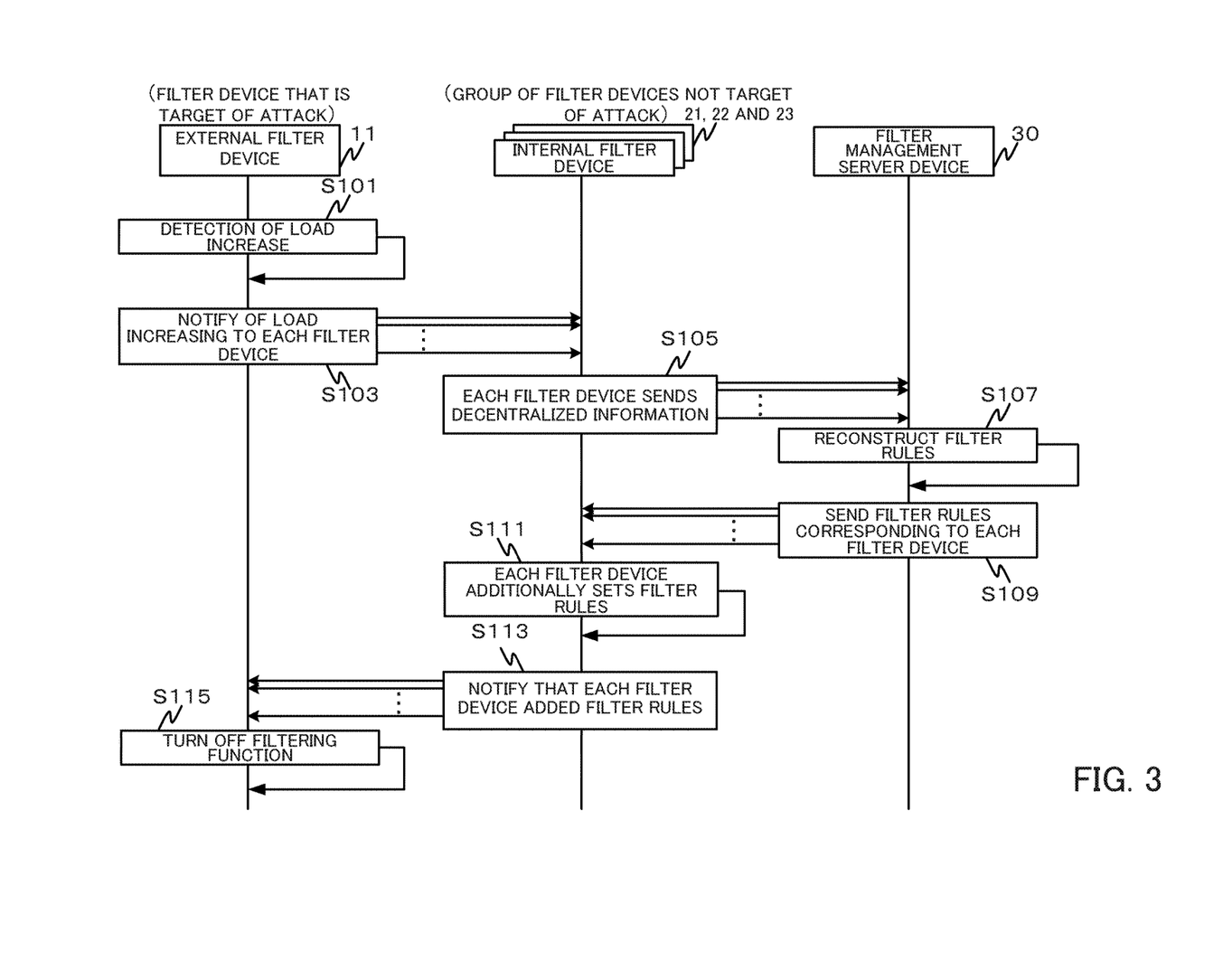
FIG. 3 is a sequence chart representing the basic operation of an overall embodiment of the present invention.

The three filter devices of the internal filter device 21, internal filter device 22 and internal filter device 23 having receiving notification of the load increase from the external filter device 11 send the decentralized information being retained by itself to the filter management server 30 (Step S105 in FIG. 3; (3-1) decentralized information C, (3-2) decentralized information D and (3-3) decentralized information E in FIG. 4-1).

The filter management server 30 receiving a total of at least K-number of decentralized information pieces from each of the respective filter devices does reconstruction of the filter rules, which are confidential information, from the received K-number of decentralized information pieces using the secret sharing scheme (Step S107 in FIG. 3; (4) filter rules reconstruction in FIG. 4-1). In the present explanation, reconstruction processing of filter rules, which are confidential information, is done from the three pieces of decentralized information of decentralized information C, decentralized information D and decentralized information E. By such reconstruction processing, all of the filter rules including the filter rules A are reconstructed.

Herein, the filter management server 30 shall receive from the external filter device 11 that the load on the external filter device 11 increased in Step S103, or receive from the internal filter device 21, internal filter device 22 and internal filter device 23 that the filter device for which the load is increasing is the external filter device 11 in Step S105. Then, the filter management server 30 shall thereby grasp that the filter device that is the attack target is the external filter device 11.

Therefore, the filter management server 30 sends the filter rules A, which are the filter rules corresponding to the external filter device 11, to the three filter devices of the internal filter device 21, internal filter device 22 and internal filter device 22 performing the supply of decentralized information (Step S109 in FIG. 3; (51) filter rules A, (52) filter rules A and (53) filter rules A in FIG. 4-2).

Herein, if the filter management server 30 is storing the reconstructed filter rules, in the case of the filter management server 30 being unauthorized accessed subsequently, the filter rules may be leaked. Therefore, the filter management server 30 erases from the filter management server 30 the filter rules reconstructed by the filter management server 30 itself, when executing sending in Step S109.

It is thereby possible to prevent filter rules from leaking from the filter management server 30. It should be noted that, in order to express this state, the decentralized information stored by the filter management server 30 in FIG. 4-2 is noted as "none".

The three internal filter devices of the internal filter device 21, internal filter device 22 and internal filter device 23 having received the filter rules A newly set the received filter rules A in themselves in addition to the filter rules already stored therein (Step S111 in FIG. 3).

In addition, the three internal filter devices of the internal filter device 21, internal filter device 22 and internal filter device 23 add the received filter rules A to the decentralized information stored in themselves.

The filter rules C and filter rules A are thereby set in the internal filter device 21 as expressed in FIG. 4-2, as well as the filter rules C and filter rules A being stored as decentralized information. In addition, similarly, the filter rules D and filter rules A are set in the internal filter device 22, as well as the filter rules D and filter rules A being stored as decentralized information. Furthermore, similarly, the filter rules E and filter rules A are set in the internal filter device 23, as well as the filter rules E and filter rules A being stored as decentralized information.

Then, the internal filter device 21, internal filter device 22 and internal filter device 23 continue filtering based on the filter rules set in its own filter device.

In addition, the three filter devices of the internal filter device 21, internal filter device 22 and internal filter device 23, when newly adding the filter rules A to itself, notify to the external filter device 11 that the filter rules A were newly added to themselves (Step S113 in FIG. 3; (6-1) notification, (6-2) notification and (6-3) notification in FIG. 4-2).

The external filter device 11 having received notification in Step S113 from all filter devices having performed the notification in Step S103 inactivates its own filtering function (Step S115 in FIG. 3; (7) filter inactivated in FIG. 4-2).

It should be noted that the external filter device 11 may store the filter rules A as decentralized information; however, there is concern over unauthorized access to the external filter device 11 being made from the attacking source, and the decentralized information being acquired by the attacking source. Therefore, the external filter device 11 may be configured so as to delete the decentralized information stored by itself in Step S115. It should be noted that, in order to express this state, the decentralized information stored by the external filter device 11 and the filter rules set in the external filter device 11 are noted as "none" in FIG. 4-2.

Thereafter, filtering of packets having passed without being filtered by the external filter device 11 becomes possible with the three filter devices of the internal filter device 21, internal filter device 22 and internal filter device 23.

The embodiment of the present invention explained above exerts several effects as shown below.

The first effect is being able to avoid a denial of service state due to interruption of communication.

The reason thereof is because, in the case of an increase in the processed volume of the filtering processing mainly caused by a load increase on the filter device, it is possible to distribute the filtering function thereof to other filter devices.

The second effect is that the security of the internal network will not decline considerably.

The reason thereof is because, although the security declines for a device having inactivated the filter function, the possessed filter rules of this device are taken over by the remaining devices.

The third effect is that the filter rules of the entire network will not be leaked, even if decentralized information is acquired from a filter device under attack.

The reason thereof is because using the (K,N) threshold scheme as the secret sharing scheme, even if assuming that a part of the filter rules were leaked, unless K-number of pieces of decentralized information were acquired, it will not be possible to reconstruct the filter rules of the entire network.

The fourth effect is that the filter rules of the entire network will not be leaked even if malfunction occurred in the filter management server itself.

The reason thereof is because, the information of the filter rules is not usually retained in the filter management server itself, and the decentralized information is only sent from each of the filter devices to the filter management server to perform reconstruction of the filter rules when any filter device notifies of a load increase due to an attack or the like.

The fifth effect is enabling to prevent a filter device having become an attack target from entering a denial of service state.

The reason thereof is because the filtering function of a filter device that is an attack target is stopped in Step S115. Since it is thereby no longer necessary for the filter device that is the attack target to perform the processing accompanying filtering, the load on the filter device that is the attack target lightens. For this reason, it is possible to prevent the filter device that is the attack target from entering a denial of service state. In addition, the CPU, etc. of the filter device that is the attack target thereby become able to continue performing processing other than the processing accompanying filtering. For example, if the filter device that is the attack target is a router, it becomes possible to continue performing processing related to routing, instead of not performing the processing accompanying filtering.

In addition, although the aforementioned embodiment is an ideal embodiment of the present invention, it is not to limit the scope of the present invention to only the above-mentioned embodiment, and it is possible to realize in forms made by conducting various modification within a scope not departing form the spirit of the present invention.

As examples thereof, three modified examples made capitalizing on the characteristic of the secret sharing scheme are represented hereinafter. It should be noted that each of the following modified examples is the same as the aforementioned embodiment in the basic configuration and operation. Therefore, in order to avoid redundancy in explanations, the configurations and operations unique to each modified example will be explained hereinafter, and explanations for portions shared with the aforementioned embodiment will be omitted.

First Modified Example

Figure 5:
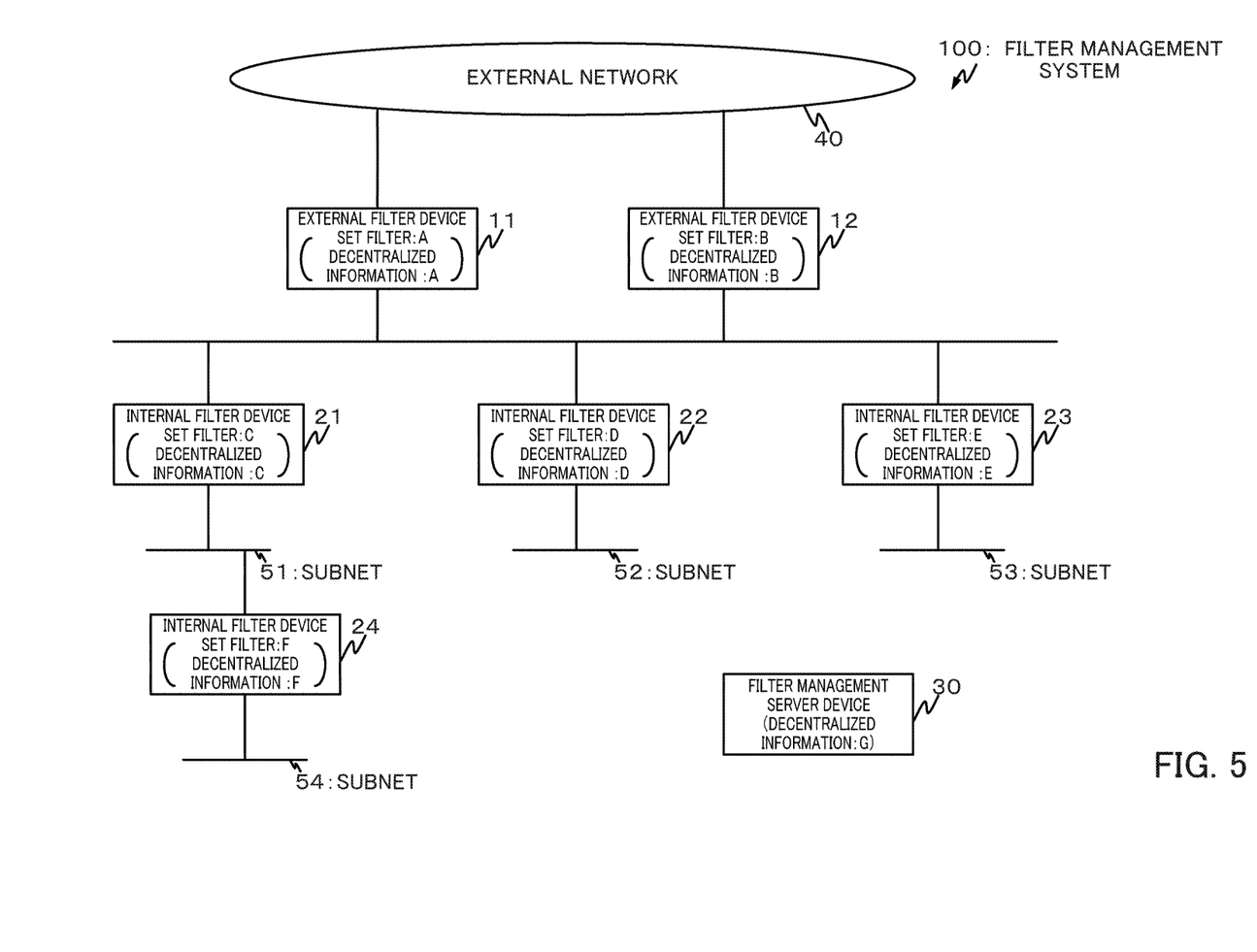
FIG. 5 is a block diagram representing the basic configuration of a first modified example of the embodiment of the present invention.

First, a first modified example will be explained by referencing FIG. 5. As expressed in FIG. 5, the decentralized information shall be stored in the filter management server 30 in the present modified example.

Herein, in the aforementioned embodiment, after sending the decentralized information to each filter device from the filter management server 30 in Step S109, the reconstructed filter rules are completely deleted from the filter management server 30. In other words, it was configured so as not to store the filter rules in the filter management server 30. In contrast, it is configured in the present modified example so that, although all of the filter rules are not stored in the filter management server 30, the decentralized information is stored therein similarly to each of the filter devices.

More specifically, in the present modified example, the filter management server 30 generates the decentralized information A to G, by distributing the filter rules to be applied to the filter management system 100 using the "secret sharing scheme" as confidential information.

Then, the filter management server 30 causes the decentralized information A to F to be stored in each of the filter devices, respectively. In addition, the filter management server 30 itself stores the decentralized information G.

It is thereby possible to also make the filter management server 30 the distribution target of decentralized information, and allows for freedom in the distribution combinations of decentralized information.

This point will be explained using a specific example. In the case of using a (3,7) threshold scheme as the secret sharing scheme, a case is assumed of there being an attack against the internal filter device 23 in addition to the external filter device 11. In this case, although it is not possible to acquire decentralized information from the internal filter device 23, it is made possible to reconstruct filter rules based on the decentralized information stored by the internal filter device 21, internal filter device 22 and filter management server 30 in the present modified example.

It should be noted that, even if configuring to use a (2,6) threshold scheme as the secret sharing scheme instead of configuring as in the present modified example, it is possible to reconstruct the filter rules based on the decentralized information stored by the internal filter device 21 and internal filter device 22, even in a case of there being an attack on the internal filter device 23. However, when configuring to use a (2,6) threshold scheme as the secret sharing scheme in this way, in the case of decentralized information having been acquired by an attacker from the external filter device 11 and internal filter device 21, it becomes a problem since reconstruction of the filter rules will be possible also on the attacker's side. However, if configured as in the present modification, it is possible to prevent such a problem from occurring.

Second Modified Example

Next, a second modified example will be explained. In the aforementioned embodiment, it is not configured so as to give weighting to the respective pieces of decentralized information, and the decentralized information is always generated by distributing the filter rules in equal allotments. In contrast, in the present embodiment, the filter rules are distributed by weighting each piece of decentralized information.

In the explanation of the aforementioned embodiment, it was explained by distinguishing each piece of decentralized information by assigning an alphabetical letter as an identifier at the end of each piece of decentralized information. In contrast, in the present modified example, each piece of decentralized information will be explained as "decentralized information XY". Herein, X is an alphabetical letter, and Y is a numeral. For example, it will be explained by noting each piece of decentralized information like "decentralized information A1" or "decentralized information C2".

Herein, the alphabetical letter X is an identifier for distinguishing each piece of decentralized information, similarly to the aforementioned embodiment. In addition, the numeral Y expresses the weight of the decentralized information.

The weight referred to herein expresses that the information volume is greater by the amount of the numeral, such that C2, D2, E2 and G2 have twice the information volume as A1, and F3 has three times the information volume as A1.

At this time, the volume of decentralized information required in order for the filter management server 30 to reconstruct the filter rules is determined by the weight of the decentralized information used in reconstruction. For example, if a (5,7) threshold scheme is used as the reconstruction secret sharing scheme, if being decentralized information having the weight of 1, i.e. decentralized information×1, 5 pieces (1×5≥5) of decentralized information are required in order for reconstruction of the filter rules. In addition, if decentralized information having a weight of 2, i.e. decentralized information×2, 3 pieces (2×3≥5) of decentralized information are required.

Furthermore, if decentralized information having a weight of 3, i.e. decentralized information×3, 2 pieces (3×2≥5) of decentralized information are required. In addition, it is also possible to reconstruct filter rules using decentralized information of different weights.

In this way, the number of pieces of information to be collected that is the minimum required in secret reconstruction will differ according to the possessed information volume of the decentralized information.

Figure 6:
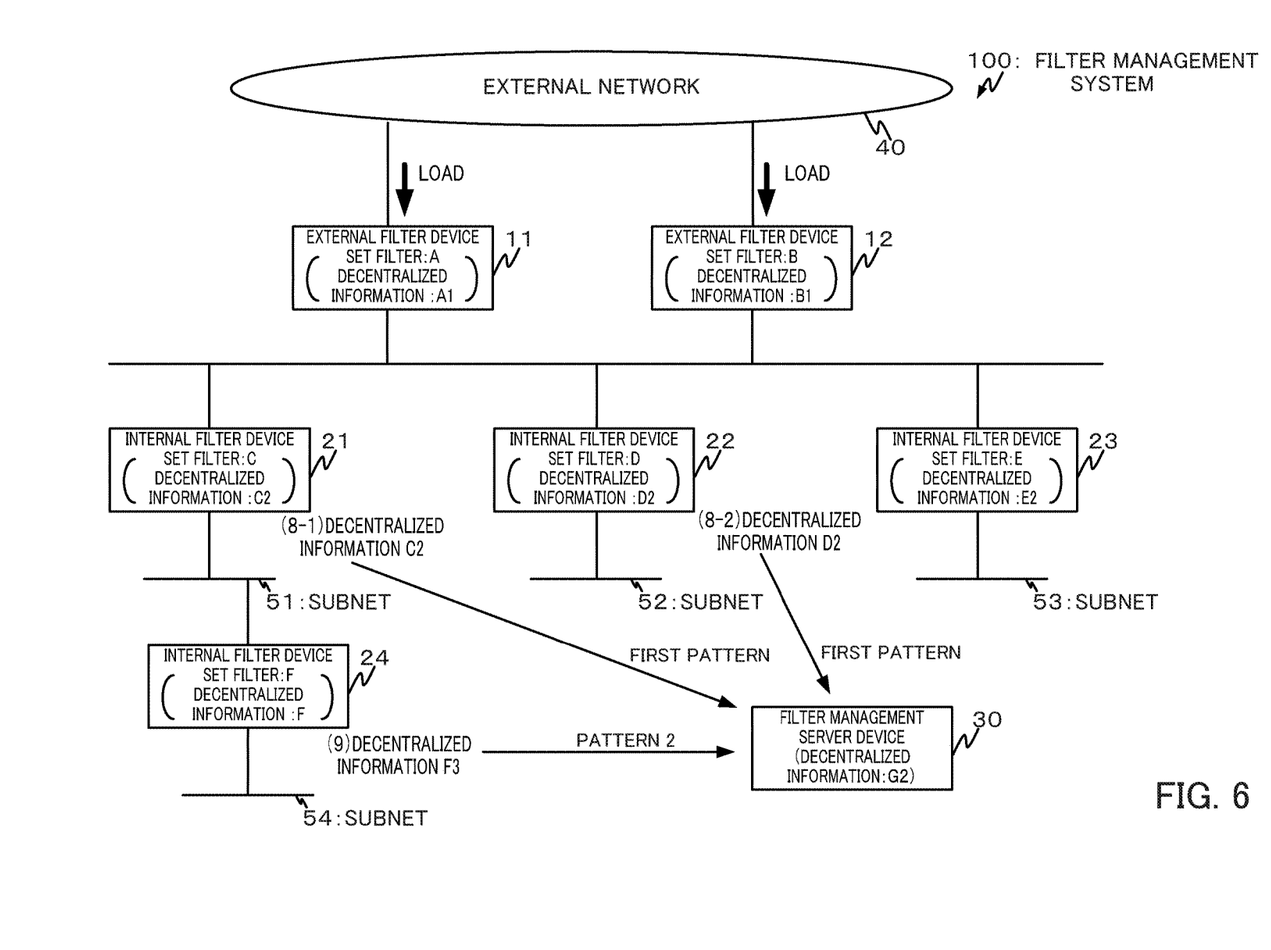
FIG. 6 is an image representing a combination pattern of decentralized information in a second modified example of the embodiment of the present invention.

This point will be explained by referencing FIG. 6. It should be noted that, in the example of FIG. 6, decentralized information is also stored in the filter management server 30. In other words, the example of FIG. 6 is an example of a case combining the first modified example and the second modified example. It should be noted that it is not necessarily required to combine the second modified example with the first modified example.

As in FIG. 6, the decentralized information is stored in the respective filter devices and the filter management server 30. On that basis, a (5,7) threshold scheme is used as the secret sharing scheme.

Given this, in the case of the external filter device 11 or external filter device 12 receiving an external attack, for example, the combination of decentralized information that is required in order to reconstruct the filter rules is considered to be two pieces, for example.

More specifically, for example, reconstructing with an information volume with weight of 6 pieces made by combining the three of the decentralized information C2, decentralized information D2 and decentralized information G2 is considered as a first pattern (FIG. 6; (8-1) decentralized information C2 and (8-2) decentralized information D2).

In addition, alternatively, as a second pattern, reconstructing with an information volume with a weight of five pieces made by combining the two of the decentralized information F3 and decentralized information G2 will be considered as the second pattern (FIG. 6; (8-3) decentralized information F3).

By configuring as in the present modified example, it is possible to raise the degrees of freedom in arrangement of filter rules. For example, so long as the filter management server 30 and internal filter devices having a lower possibility of receiving an attack than the external filter devices, it is better to configure so that this filter management server 30 and internal filter devices store decentralized information of larger information volume.

This is because, if configuring in this way, this filter management server 30 and internal filter devices can reconstruct the decentralized information so long as normally operating, even if few in number. In addition, this is because, even if the external filter device is attacked and a part of the decentralized information is leaked, since the information volume of this leaked decentralized information is small, it is possible to reduce the leaking amount of information related to the filter rules.

Third Modified Example

Next, a third modified example will be explained. In the present modified example, in the case of a given filter device receiving an attack, the filter rules set in this given filter device are divided into a plurality of filter rules. Then, the divided plurality of filter rules is additionally set in each of the different filter devices.

Figure 7:
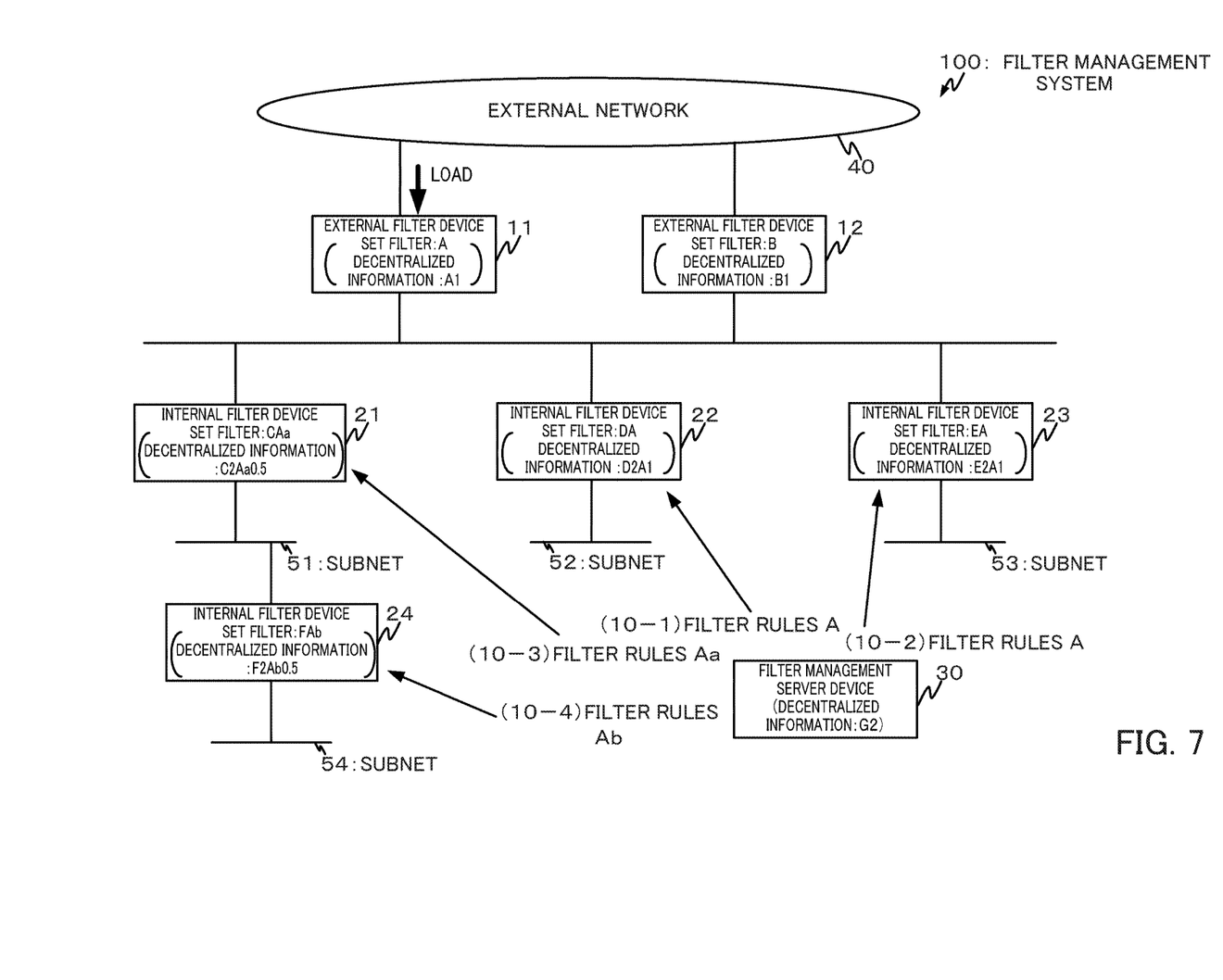
FIG. 7 is an image representing the setting of filter rules in a third modified example of the embodiment of the present invention.

This point will be explained by referencing FIG. 7. It should be noted that the example in FIG. 7 assumes that the external filter device 11 is receiving an attack. In addition, in the example of FIG. 7, the decentralized information is made to also be stored in the filter management server 30. Furthermore, weighting is performed on the respective decentralized information. In other words, the example in FIG. 7 is an example of a case combining the first modified example and the second modified example with the third modified example. It should be noted that it is not necessarily required to combine the third modified example with the first modified example or second modified example, for example.

As stated in the explanation of the aforementioned embodiment, if the external filter device 11 receives an attack, the internal filter device 21, internal filter device 22, internal filter device 23, etc. will send the decentralized information stored by its own filter device to the filter management server 30.

Then, the filter management server 30 reconstructs the filter rules based on these pieces of decentralized information. Then, the filter rules A, which are filter rules corresponding to the external filter device 11, are extracted from the reconstructed filter rules.

Then, the extracted filter rules A are sent to the internal filter device 22 and internal filter device 23 (FIG. 7; (10-1) filter rules A and (10-2) filter rules A). The internal filter device 22 and internal filter device 23 set these filter rules A in its own filter device. Thus far, the operation is the same as the aforementioned embodiment.

On the other hand, in the present modified example, the filter rules A are divided into filter rules Aa and filter rules Ab, and these are sent to the internal filter device 21 and an internal filter device 24 located at the inner side to this internal filter device 21.

More specifically, the filter rules Aa are sent to the internal filter device 21 (FIG. 7; filter rules Aa). In addition, the filter rules Ab are sent to the internal filter device 24 (FIG. 7; filter rules Ab).

The internal filter device 21 and internal filter device 24 additionally set the received filter rules in its own filter device. In addition, the internal filter device 21 and internal filter device 24 additional store the received filter rules as decentralized information. Herein, the information volume of the decentralized information A in the present example is 1, as expressed in the drawings. Then, since the information arrived at by dividing the decentralized information A corresponds to the decentralized information Aa and decentralized information Ab, the information volume of these is 0.5. For this reason, the drawings note as decentralized information A1, decentralized information Aa0.5 and decentralized information Ab0.5.

In the present embodiment explained above, it is not required for the filter rules of the filter device under attack to be added in entirety to one filter device, and so long as there is a filter device in the same network, it is possible to distribute and perform the arrangement of processing allocation.

For this reason, for example, as in the technology described in Patent Document 1, the present embodiment is suited to a case of there being a desire to apply filter rules of heavy information volume to any filter device, and apply filter rules of light information volume to other filter devices. The reason thereof is because, if the present embodiment, in the case of a filter device to which filter rules of heavy information volume are applied receives an attack, it is possible to establish filter rules having light information volume by dividing these filter rules of heavy information volume, and apply these filter rules of light information volume to other filter devices.

It should be noted that, with the aforementioned respective embodiments and modified examples, the number of pieces of decentralized information and the number of filter devices has been in a 1-to-1 relationship. This may be modified to make a relationship larger than 1. For example, the filter rules are divided into five pieces of decentralized information. Then, the same decentralized information is sent to the external filter device 11 and external filter device 12. The same filter rules are thereby applied to the external filter device 11 and the external filter device 12. Then, the remaining four pieces of decentralized information are sent to the internal filter devices 21 to 24. By configuring in this way, even if assuming that both the external filter device 11 and the external filter device 12 received attacks and decentralized information is leaked from both, it is possible to suppress the number of pieces of leaking decentralized information to one piece.

In addition, in the aforementioned respective embodiments and modified examples, the filter rules corresponding to a filter device under attack are sent to the filter devices having performed the provision of decentralized information. However, in the case of a filter device other than the filter devices having performed the provision of decentralized information being present more inwards than the filter device under attack, it is better to configure so as to send the filter rules corresponding to the filter device under attack also to this filter device. Then, it is better to configure so as to set the filter rules sent in this filter device.

It should be noted that the filter management server and each of the filter devices included in the above-mentioned filter management system can each be realized by hardware, software or a combination thereof. In addition, the filter management method performed by the filter management server and filter devices included in the above-mentioned filter management system can also be realized by hardware, software or a combination thereof. Herein, realized by software indicates the matter of being realized by a computer reading and executing a program.

The program can be stored using various types of non-transitory computer readable media, and supplied to the computer. The non-transitory computer readable medium includes various types of tangible storage media. Examples of non-transitory computer readable storage media are magnetic recording media (e.g., flexible disk, magnetic tape, hard disk drives, magneto-optical recording media (e.g., magneto-optical disk), CD-ROM (Read Only Memory), CD-R, CD-R/W, semiconductor memory (e.g., microROM, PROM (programmable ROM), EPROM (Erasable PROM), flash ROM, RAM (Random Access Memory)).

A part or all of the above-mentioned embodiments can also be described as noted below; however, it is not limited to the following.

(Additional Notation 1) A filtering system includes: a plurality of devices which perform filtering of communication data based on filter rules, and a management device which manages the filter rules, in which the management device, in a case of a first of the devices that is connected to an external network not through another of the devices having entered a predetermined state, reconstructs decentralized filter rules set in the first of the devices based on a plurality of decentralized filter rules received from a plurality of second of the devices connected to an external network via the first of the devices, and sets the decentralized filter rules thus reconstructed in the plurality of second devices, and in which the decentralized filter rules are decentralized to be able to reconstruct the filter rules without using all of the decentralized filter rules.

(Additional Notation 2) In the filtering system as described in Additional Notation 1, the first of the devices performs notification to a plurality of the second devices in a case of the first of the devices having entered the predetermined state, each of the plurality of the second devices having received the notification sends the decentralized filter rules to the management device, and the management device performs the reconstruction based on the decentralized filter rules received from each of the plurality of the second devices.

(Additional Notation 3) In the filtering system as described in Additional Notation 2, the first of the devices performs the notification in a case of the first of the devices entering a predetermined state caused by execution of filtering of the communication data.

(Additional Notation 4) In the filtering system as described in any one of Additional Notations 1 to 3, the first of the devices interrupts execution of the filtering in a case of the first of the devices having entered the predetermined state, while continuing relay of transmission of communication data between the external network device and the second device.

(Additional Notation 5) In the filtering system as described in any one of Notes 1 to 4, wherein the management device deletes pre-decentralization filter rules and decentralized filter rules from the management system itself, if having set the decentralized filter rules in each device.

(Additional Notation 6) In the filtering system as described in any one of Notes 1 to 5, wherein the management device causes decentralized filter rules set in the first of the devices and decentralized filter rules set in the second devices to differ.

(Additional Notation 7) In the filtering system as described in any one of Additional Notations 1 to 6, the second device, in a case of having set decentralized filter rules corresponding to the first of the devices therein, executes the filtering based on both filter rules among decentralized filter rules corresponding to said second device set in said second device, and the decentralized filter rules corresponding to the first of the devices.

(Additional Notation 8) In the filtering system as described in any one of Additional Notations 1 to 7, the management device reconstructs pre-decentralization filter rules based on decentralized filter rules received from each of the plurality of the second devices, and reconstructs the decentralized filter rules corresponding to the first of the devices by decentralizing the reconstructed filter rules again.

(Additional Notation 9) In a management device that is communicably connected with a plurality of devices performing filtering of communication data based on filter rules, and that manages the filter rules, in a case of a first of the devices connecting to an external network not through another of the devices having entered a predetermined state, the management device reconstructs decentralized filter rules set in the first of the devices, based on a plurality of decentralized filter rules received from a plurality of second of the devices connecting to the external network via the first of the devices, and sets the decentralized filter rules thus reconstructed in the plurality of the second of the devices, and the decentralized filter rules are distributed to be able to reconstruct the filter rules without using all of the decentralized filter rules.

(Additional Notation 10) In a filtering method performed by a system which includes a plurality of devices performing filtering of communication data based on filter rules, and a management device that manages the filter rules, the method includes:

the management device, in a case of a first of the devices that is connected to an external network not through another of the devices having entered a predetermined state, reconstructing decentralized filter rules set in the first of the devices based on a plurality of decentralized filter rules received from a plurality of second of the devices connected to an external network via the first of the devices, and sets the decentralized filter rules thus reconstructed in the plurality of second devices, in which the decentralized filter rules are decentralized to be able to reconstruct the filter rules without using all of the decentralized filter rules.

(Additional Notation 11) In a management program for enabling a computer that is communicably connected with a plurality of devices performing filtering of communication data based on filter rules to function as a management device for managing the filter rules, the computer, in a case of a first of the devices connected with the external network by not going through another of the devices, entering a predetermined state, reconstructs decentralized filter rules set in the first of the devices based on a plurality of decentralized filter rules received from a plurality of second of the devices connected to the external network via the first of the devices, and sets the decentralized filter rules thus reconstructed in the plurality of the second of the devices, in which the decentralized filter rules are decentralized to enable reconstructing the filter rules without using all of the decentralized filter rules.

(Additional Notation 12) A filter management device includes: a filter management means for generating a plurality of decentralized filter rules by decentralizing filter rules used for performing filtering of communication data; and a sending means for sending the plurality of the decentralized filter rules to a plurality of devices executing the filtering, in which the filter management means performs the decentralization so that pre-decentralization filter rules can be reconstructed when using at least a predetermined number of pieces of the decentralized filter rules.

(Additional Notation 13) The filter management device as described in Additional Notation 12 receives from the plurality of devices at least a predetermined number of pieces of the decentralized filter rules sent to the plurality of devices, and reconstructs the pre-decentralization filter rules using the predetermined number of pieces of filter rules thus received.

(Additional Notation 14) The filter management device as described in Additional Notation 12 or 13 generates filter rules identical to decentralized filter rules previously sent to a first device among the devices by decentralizing the pre-decentralization filter rules again, and sends the filter rules thus generated to a second device among the devices.

(Additional Notation 15) In the filter management device as described in Additional Notation 14, the first device is a device subjected to a load of at least a predetermined weight.

(Additional Notation 16) In the filter management device as described in Additional Notation 14, the first device is a device connecting to an external network without going through another device, and the second device is a device connecting to the external network through the first device.

(Additional Notation 17) The filter management device as described in any one of Additional Notations 12 to 16 deletes the pre-decentralization filter rules and the decentralized filter rules from the filter management device, if the sending means has sent the decentralized filter rules.

(Additional Notation 18) A filter management system includes the filter management device as described in any one of Additional Notations 12 to 17 and the devices, in which the devices, when receiving the decentralized filter rules from the filter management device, execute the filtering based on the filter rules thus received.

(Additional Notation 19) In the filter management system as described in Additional Notation 18, the device, when detecting that a load of at least a predetermined weight is acting on said device, performs notification to another device, the other device receiving the notification sends the decentralized filter rules stored by the other device to the filter management device, and the filter management device receives at least the predetermined number of pieces of the decentralized filter rules from the other device, and reconstructs the pre-decentralization filter rules using the predetermined number of pieces of the filter rules thus received.

This application claims the benefit of priority of Japanese Patent Application No. 2015-145636 filed on Jul. 23, 2015, the entire disclosure of which is incorporated herein by reference in its entirety.

INDUSTRIAL APPLICABILITY

The present invention is widely suited to use in filtering in a network without regard for the type of communication devices or type of network.

EXPLANATION OF REFERENCE NUMERALS 11, 12 external filter device
21, 22, 23, 24 internal filter device
30 filter management server
31 filter management unit
32 calculation section
33 storage section
34 communication unit
40 external network
51, 52, 53, 54 subnet
100 filter management system

The invention claimed is:

1. A filtering system comprising:
a plurality of filter devices; and
a filter management device, the plurality of filter devices and the filter management device being implemented by hardware, including at least one computer processor and at least one memory,
wherein the filter management device decentralizes, with weighting performed, a whole set of filter rules to obtain weighted sets of decentralized filter rules so as to reconstruct the whole set of filter rules without using all the weighted sets of decentralized filter rules, and sets the weighted sets of decentralized filter rules in the plurality of filter devices,
wherein the plurality of filter devices perform filtering of communication data based on the set weighted sets of decentralized filter rules,
wherein in a case where a first filter device out of the plurality of filter devices has entered a predetermined state, the first filter device being directly connected to an external network rather than through another one of the filter devices, the filter management device reconstructs a set of decentralized filter rules set in the first filter device based on a plurality of weighted sets of decentralized filter rules received from a plurality of second filter devices connected to the external network via the first filter device, and sets the set of decentralized filter rules thus reconstructed in the plurality of second filter devices, and
wherein in the case where the first filter device has entered the predetermined state, the first filter device interrupts execution of the filtering while continuing relay of transmission of communication data between the external network and the second filter devices.

2. The filtering system according to claim 1,
wherein the first filter device sends notification to the plurality of the second filter devices in a case where the first filter device has entered the predetermined state, and
wherein each second filter device having received the notification sends the set of decentralized filter rules set in each second filter device to the filter management device.

3. The filtering system according to claim 2, wherein the first filter device performs the notification in a case where the first filter device enters a predetermined state caused by execution of filtering of the communication data.

4. The filtering system according to claim 1, wherein the filter management device deletes the whole set of filter rules and the weighted sets of decentralized filter rules from the filter management device itself, when the weighted sets of decentralized filter rules are set in the plurality of filter devices.

5. The filtering system according to claim 1, wherein the set of decentralized filter rules set in the first filter device differs from the set of decentralized filter rules set in the second filter devices.

6. The filtering system according to claim 1, wherein each second filter device, in a case where each second filter device has been set, the set of decentralized filter rules corresponding to the first filter device therein, executes the filtering based on both of the set of decentralized filter rules set primarily in each second filter device and the set of decentralized filter rules corresponding to the first filter device.

7. A filter management device, being implemented by hardware including at least one computer processor and at least one memory, that is communicably connected with a plurality of filter devices performing filtering of communication data based on sets of decentralized filter rules set by the filter management device,
wherein the filter management device decentralizes, with weighting performed, a whole set of filter rules to obtain weighted sets of decentralized filter rules so as to reconstruct the whole set of filter rules without using all the weighted sets of decentralized filter rules and sets the weighted sets of decentralized filter rules in the plurality of filter devices, and
wherein, in a case where a first filter device out of the plurality of filter devices has entered a predetermined state, the first filter device being directly connected to an external network rather than through another one of the filter devices, the filter management device reconstructs a set of decentralized filter rules set in the first filter device, based on a plurality of weighted sets of decentralized filter rules received from a plurality of second filter devices connected to the external network via the first filter device, and sets the set of decentralized filter rules thus reconstructed in the plurality of second filter devices.

8. A filtering method performed by a system which includes a plurality of filter devices and a filter management device, the plurality of filter devices and the filter management device being implemented by hardware, including at least one computer processor and at least one memory, the filtering method comprising:
decentralizing by the filter management device, with weighting performed, a whole set of filter rules to obtain weighted sets of decentralized filter rules so as to reconstruct the whole set of filter rules without using all the weighted sets of decentralized filter rules and sets the weighted sets of decentralized filter rules in the plurality of filter devices,
performing, at the plurality of filter devices, filtering of communication data based on the set weighted sets of decentralized filter rules,
reconstructing by the filter management device, in a case where a first filter device out of the plurality of filter devices has entered a predetermined state, the first filter device being directly connected to an external network rather than through another one of the filter devices, a set of decentralized filter rules set in the first filter device based on a plurality of weighted sets of decentralized filter rules received from a plurality of second filter devices connected to the external network via the first filter device, and
setting by the filter management device, the set of decentralized filter rules thus reconstructed in the plurality of the second filter devices,
wherein in the case where the first filter device has entered the predetermined state, the first filter device interrupts execution of the filtering while continuing relay of transmission of communication data between the external network and the second filter devices.

9. A non-transitory computer-readable medium on which a management control program is recorded, said program, when executed, enabling a computer that is communicably connected with a plurality of filter devices to perform filtering of communication data based on sets of decentralized filter rules set by the computer to function as a filter management device for managing the filter rules,
wherein the computer decentralizes, with weighting performed, a whole set of filter rules to obtain weighted sets of decentralized filter rules so as to reconstruct the whole set of filter rules without using all the weighted sets of decentralized filter rules and sets the weighted sets of decentralized filter rules in the plurality of filter devices, and
wherein in a case where a first filter device out of the plurality of filter devices has entered a predetermined state, the first filter device being directly connected with an external network rather than through another one of the filter devices, the computer reconstructs a set of decentralized filter rules set in the first filter device based on a plurality of weighted sets of decentralized filter rules received from a plurality of second filter devices connected to the external network via the first filter device, and sets the set of decentralized filter rules thus reconstructed in the plurality of second filter devices.

* * * * *